March 21, 1950 H. T. RIGHTS 2,501,356
ATTRACTION-REPULSION MOVING IRON VANE INSTRUMENT
Filed Dec. 22, 1943
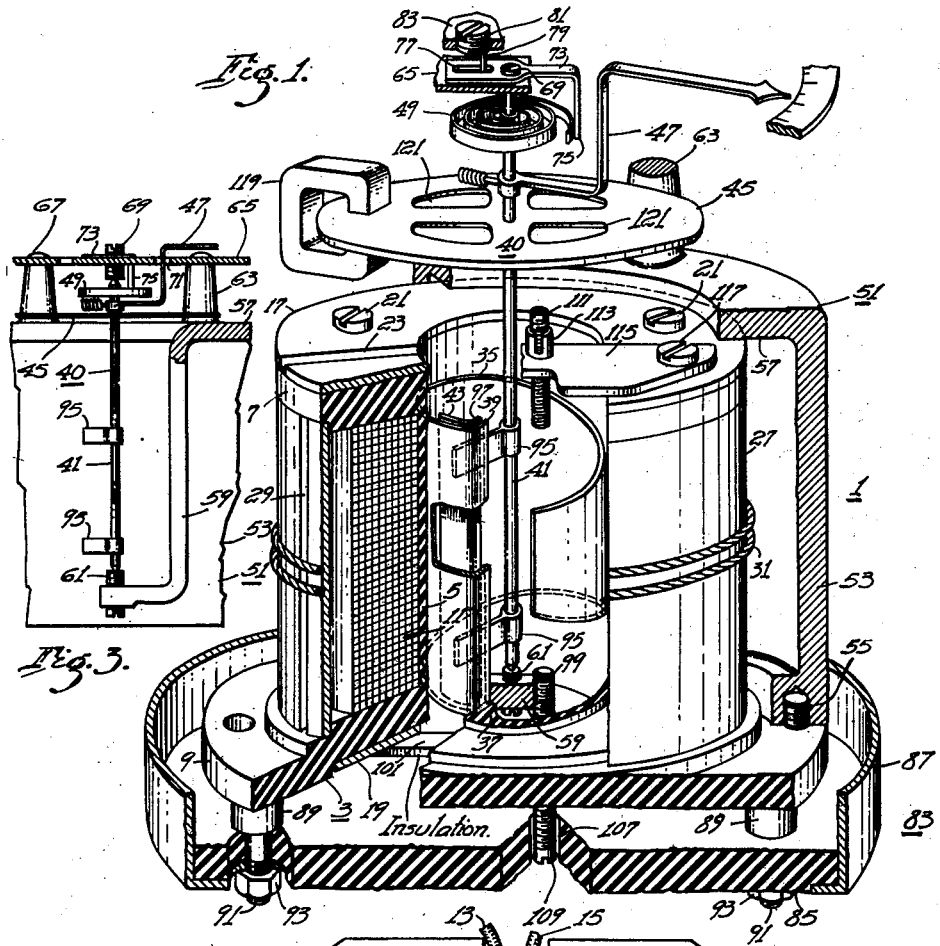
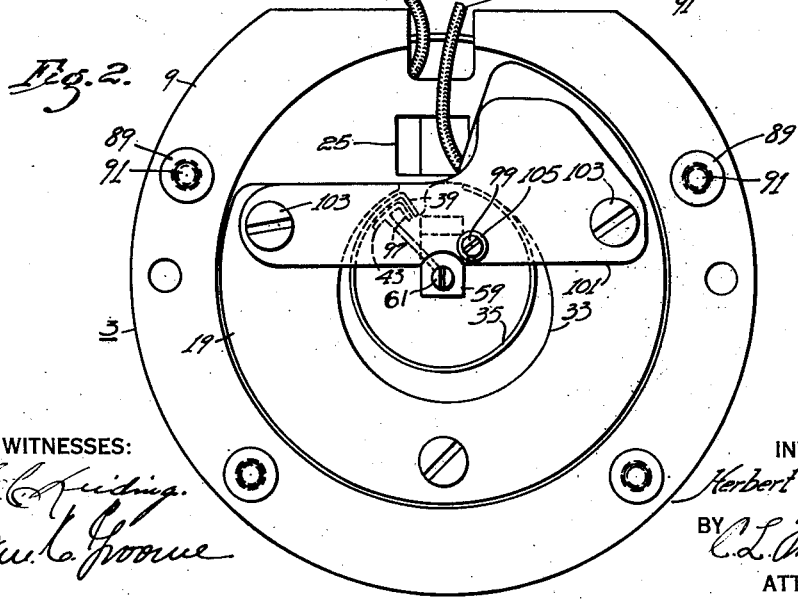
WITNESSES:
INVENTOR
Herbert T. Rights.
BY
ATTORNEY Patented Mar. 21, 1950

2,501,356

UNITED STATES PATENT OFFICE 2,501,356

ATTRACTION-REPULSION MOVING IRON VANE INSTRUMENT

Herbert T. Rights, Verona, N. J., assignor to Westinghouse Electric Corporation, East Pittsburgh, Pa., a corporation of Pennsylvania Application December 22, 1943, Serial No. 515,263

7 Claims. (Cl. 171—95)

This invention relates to electrical instruments and it has particular relation to electrical measuring instruments of the moving-iron type.

A moving-iron instrument includes a winding for producing a magnetic field. A plurality of magnetic elements usually formed of soft iron are disposed in the magnetic field produced by current flowing in the winding. When these magnetic elements are magnetized they develop attraction or repulsion forces therebetween. One of the magnetic elements is disposed for rotation with respect to the remainder of the magnetic elements under the influence of these forces. Among the problems presented in the design of a moving-iron instrument is the provision of a suitable scale distribution without undue complication of the design. In an effort to improve the scale distribution prior art instruments have employed fixed irons on opposite sides of the moving iron as shown, for example, in the Danish Patent 29,763.

In accordance with the invention, a moving-iron instrument is provided with a winding effective when energized for producing a magnetic field. A substantially cylindrical fixed magnetic element or iron is disposed in this magnetic field and has an axial length which varies from a predetermined value at one end (which may be termed the down-scale end) to a smaller value at the opposite end (which may be termed the up-scale end). A moving magnetic element or iron is disposed adjacent the fixed magnetic iron for rotation substantially about the axis of the fixed magnetic iron. The magnetization of the fixed and moving magnetic irons by the magnetic field results in a repulsion force therebetween. Because of the tapered construction of the fixed magnetic iron, the repulsion force has a torque component tending to rotate the moving iron towards the up-scale end of the fixed magnetic iron.

To improve the sensitivity of the instrument adjacent the down-scale end thereof, the fixed magnetic iron is provided with a lip or flange having a substantial surface which lies in a plane substantially containing the axis of rotation of the moving iron. This flange cooperates with an edge of the moving iron to develop an additional force or torque which assists in urging the moving iron towards the up-scale end of the fixed iron. To increase the additional torque, the moving iron also is provided with a lip or flange which is positioned adjacent the flange of the fixed iron when the moving iron is adjacent its extreme down-scale position.

For additionally controlling the movement of the moving iron, a fixed magnetic element or iron is disposed in the magnetic field for adjustment in a direction substantially parallel to the axis of rotation of the moving iron. This fixed iron may take the form of a magnetic screw which is adjustable with respect to an associated supporting element. The supporting element and screw, if desired, may be constructed for removal as a unit from the winding of the instrument without destroying the adjustment of the screw with respect to the supporting element. If the instrument is positioned within a housing, the housing preferably is provided with an opening through which the screw may be adjusted.

The distribution of magnetic flux in the magnetic field of the instrument is controlled independently of the fixed and moving irons by the shape of a noncircular opening in a magnetic element adjacent the magnetic field through which the magnetic flux passes. By suitable configuration of the noncircular opening, the magnetic reluctance offered to magnetic flux in the magnetic field may be controlled locally with respect to the magnetic field to provide a desired magnetic flux distribution in the field.

It is therefore an object of the invention to provide an improved electrical instrument of the moving-iron type.

It is a further object of the invention to provide a moving-iron electrical instrument wherein fixed and moving magnetic elements have first surfaces adjacent each other over a substantial portion of the travel of the moving magnetic element with respect to the fixed magnetic element, and have second surfaces adjacent each other in a predetermined position of the moving magnetic element with respect to the fixed magnetic element, the first and second surfaces being angularly disposed with respect to each other, the instrument also having an additional fixed magnetic element for influencing movement of the moving magnetic element.

It is a still further object of the invention to provide a moving-iron instrument with a fixed magnetic element which is adjustable in a direction parallel to the axis of rotation of an associated moving magnetic element.

It is another object of the invention to provide a moving-iron instrument having a housing associated therewith and having a fixed magnetic element which is adjustable externally of the housing.

It is also an object of the invention to provide a moving-iron electrical instrument having fixed and moving magnetic elements positioned in a magnetic field with means independent of the magnetic elements for controlling the flux distribution in the magnetic field.

Other objects of the invention will be apparent from the following description taken in conjunction with the accompanying drawing, in which:

Figure 1 is a view in perspective with parts broken away of an electrical instrument embodying the invention.

Fig. 2 is a view in bottom plan with parts removed of the instrument illustrated in Fig. 1, and Fig. 3 is a detail view in sectional elevation showing a rotor assembly and supporting frame therefor suitable for the instrument of Fig. 1.

Referring to the drawing, Fig. 1 shows a moving-iron instrument having a stator assembly 1 which includes a coil spool 3. The coil spool 3 is formed with a tubular portion 5 having flanges 7 and 9 at its ends. The tubular portion 5 and the flanges 7 and 9 conveniently may be molded as an integral unit from a suitable insulating material such as a phenolic resin. A winding 11 surrounds the tubular portion 5 and has terminals 13 and 15 which project through openings in the flange 9 (Fig. 2). When energized, the winding 11 produces a magnetic field within the tubular portion 5. To assist in directing magnetic flux into the tubular portion 5, magnetic members 17 and 19 are suitably secured to the flanges 7 and 9 as by cement or machine screws 21. The magnetic members 17 and 19 may take the form of rings constructed of a magnetic material such as soft iron. If the instrument is to be employed for alternating current measurements, the ring 17 may be provided with a slot 23 for the purpose of restricting eddy-current flow therein. A somewhat larger slot or gap 25 (Fig. 2) may be provided in the ring 19 for the same purpose and for the additional purpose of permitting passage therethrough of the terminals 13 and 15. A magnetic band 27 which surrounds the winding 11 may be formed of a suitable magnetic material such as soft iron. The ends of the band 27 may be spaced to provide an axial slot 29 to restrict flow of eddy-currents therein. The band 27 may be secured in position by a few turns of cord 31 secured therearound. By inspection of Fig. 2, it will be observed that the ring 19 is provided with a noncircular opening 33 which is substantially in alignment with the tubular portion 5. By suitably controlling the shape of the noncircular opening 33, the magnetic reluctance offered to magnetic flux in the tubular portion 5 may be controlled locally to control the magnetic flux distribution in the tubular portion 5.

A fixed magnetic element 35 of substantially cylindrical shape is disposed in the tubular portion 5 and is securely cemented to the tubular portion. To facilitate proper location of the fixed magnetic element 35, the tubular portion may be provided with an integral abutment 37 against which one end (which may be termed the down-scale end) of the fixed magnetic element is placed. The fixed magnetic element 35 may be formed of suitable magnetic sheet material such as soft iron. By inspection of Fig. 1 it will be observed that the axial length of the fixed magnetic element or fixed iron 35 varies from a predetermined value adjacent the down-scale thereof to a smaller length adjacent the remaining end which may be termed the up-scale end thereof. For a purpose hereinafter set forth, the down-scale end of the fixed iron 35 is bent inwardly to provide a lip or flange 39 having substantial surfaces which are substantially parallel to a plane containing the axis of the fixed iron 35.

The instrument has a rotor assembly 40 which includes a shaft 41, a moving magnetic element 43, a damping member or disk 45, a pointer 47, and a spiral control spring 49. The rotor assembly is supported by a frame 51 which includes a shell 53 secured to the flange 9 by suitable machine screws 55. Conveniently the frame 51 may be an aluminum casting. The shell 53 has a flange 57 which overlies the ring 17 and which has an L-shaped bracket 59 projecting therefrom into the tubular portion 5. The bracket 59 has a jewel or bearing screw 61 in threaded engagement therewith for receiving one end of the shaft 41. The flange 57 also has pillars 63 projecting therefrom about the damping member 45. A bridge plate 65 is attached to these pillars by suitable machine screws 67 (Fig. 3). The bridge plate 65 has in threaded engagement therewith a jewel or bearing screw 69 for receiving an end of the shaft 41. Also the bridge plate 65 has an arcuate opening 71 therein through which the pointer 47 projects for rotation with the shaft 41 as a unit with respect to the frame 51.

The bridge plate 65 also carries a lever 73 which is mounted for rotation about the axis of the shaft 41. This lever 73 has a lug 75 projecting therefrom to which the outer end of the spiral control spring 49 is secured by solder. In addition, the lever 73 has a slot 77 for receiving a pin 79 eccentrically secured to a zero adjusting button 81. The button 81 is rotatable with respect to a portion of a housing 83 which also includes a base member 85 and a shell 87. It will be understood that the housing surrounds the electrical instrument but is broken away in Fig. 1 for the purpose of exposing the instrument. Spacers 89 project from the flange 9 to engage the base member 85 and have studs 91 projecting through openings in the base member. Nuts 93 cooperate with the studs 91 to secure the instrument to the base member 85.

The moving magnetic element 43 is formed of a suitable material such as soft iron and is attached to the shaft 41 by means of suitable brackets 95. It will be observed that the moving magnetic element or iron 43 has an arcuate surface adjacent the interior surface of the fixed iron 35. When magnetic flux passes through the tubular portion 5, the fixed iron 35 and moving iron 43 are magnetized to develop a substantial repulsion force therebetween. Since the fixed iron 35 is tapered in an up-scale direction, a component of the repulsion force is in a tangential direction with respect to the path of movement of the moving iron 43 and urges the moving iron in an up-scale direction. Such motion of the moving iron is opposed by the bias exerted by the spiral control spring 49.

When the moving iron 43 is in the position illustrated in Fig. 1, the flange 39 extends across an edge of the moving iron 43. Consequently magnetic flux passing through the tubular portion 5 produces a repulsion force acting between the flange 39 and the associated edge of the moving iron 43. This repulsion force corresponds to an additional torque which urges the moving iron in an up-scale direction. To increase this additional torque, the moving iron 43 is provided with a lip or flange 97 which is adjacent the flange 39 when the moving iron 43 is in the position illustrated in Fig. 1. The provision of the flanges 39 and 97 materially increases the sensitivity of the instrument when the moving iron 43 is in the vicinity of the flange 39. Consequently the flanges tend to open the scale of the instrument adjacent the down-scale end thereof.

In order to improve the performance of the instrument when the moving iron 43 is adjacent the up-scale end of the fixed iron 35, an additional fixed magnetic element is provided for influencing the movement of the moving iron 43. This additional magnetic element conveniently may be in a form of a soft iron screw 99 which is positioned to act as an attraction iron. When the moving iron 43 is adjacent the up-scale end of the fixed iron 35 an attraction force is developed between the moving iron 43 and the attraction iron 99 which increases the resultant torque acting to urge the moving iron 43 towards its extreme up-scale position. The attraction iron 99 is mounted on a supporting strip 101 which may be formed of any suitable material, and is secured to the flange 9 by means of machine screws 103. These screws 103 may be removable, but in most applications they may be non-removable or drive screws. If formed of electroconductive material, the strip 101 may be insulated from the ring 19 to reduce eddy-current flow therethrough. If desired, however, the strip 101 may be formed of an insulating material such as a phenolic resin. The strip 101 has a bushing 105 extending therethrough which is threaded internally for receiving the attraction iron 99. The bushing 105 may be of resilient construction and may be split as illustrated in Fig. 2 to grip the attraction iron 99 securely. Because of its resilient action, the bushing retains the attraction iron 99 in any position to which it is adjusted.

By inspection of the drawing, it will be observed that the attraction iron 99 is substantially cylindrical and that it is adjustable in a direction parallel to the shaft 41. Such adjustment is effected simply by rotating the attraction iron 99 to advance or retract it. Such adjustment does not change the distance of the attraction iron from the movable iron 43 but merely changes the effective length of the attraction iron. Such a change has been found effective in adjusting the instrument. If the screws 103 are removable, the attraction iron 99 and its supporting strip 101 may be removed as a unit from the flange 9. Such removal does not destroy the adjustment of the attraction iron 99 with respect to its supporting strip. Consequently, for such a construction, if it is necessary to remove the strip 101 and attraction iron for servicing or other reasons, generally it is not necessary to readjust the instrument after reassembly thereof. It will be noted that the attraction iron 99 projects through an opening 107 in the base member 85, and that the attraction iron has a slot 109 which is externally accessible. For this reason the attraction iron may be adjusted externally of the housing 83. If desired, an additional attraction iron 111, bushing 113 and supporting strip 115, which correspond in construction to the attraction iron 99, bushing 105 and supporting strip 101, may be secured to the flange 7 by means of screws 117. The additional attraction iron 111 increases the attraction force available for urging the moving iron 43 in an up-scale direction. However, it has been found that the single attraction iron 99 is sufficient in most cases. For this reason the attraction iron 111, bushing 113, and supporting strip 115 generally are not required.

The damping member 45 may take the form of an electroconductive disk which is positioned for rotation between the poles of a permanent magnet 119. As well understood in the art, the permanent magnet 119 and the damping disk 45 cooperate to damp rotation of the rotor assembly. To lighten the damping disk and to permit inspection of the mechanism in the armature portion 5 therethrough, a plurality of openings 121 are provided in the damping disk.

It is believed that the construction and operation of the instrument illustrated in the drawing now may be set forth. After the winding 11 is applied to the spool 3, the fixed iron 35, the rings 17 and 19, and the band 27 are attached to the spool. In addition the attraction iron 99 and its supporting strip 101 are secured to the flange 9 by means of the screws 103.

The rotor assembly 40 is separately assembled by securing the moving iron 43, the damping disk 45, the pointer 47 and the inner end of the spiral control spring 49 thereto. The rotor 40 is next assembled in the frame 51 by passing the moving vane 43 through the centrally disposed opening in the flange 57. The bridge plate 65 is slipped over the pointer 47 and is secured to the pillars 63 by means of the machine screws 67. With the parts in the positions illustrated in Fig. 3, the bearing screws 61 and 69 are adjusted to position the rotor assembly 40 for rotation with respect to the frame 51. The lug 75 next is soldered to the outer end of the spiral control spring 49.

The frame 51, together with the rotor assembly 40 mounted therein, is positioned as a unit on the flange 9 and is secured to the flange by means of the machine screws 55. During this operation the bracket 59 and the moving iron 43 pass through the tubular portion 5 into the position illustrated in Fig. 1. The damping magnet 119 is positioned with its pole faces adjacent the disk 45 and is secured to the stator assembly by suitable means (not shown).

The entire instrument in assembled condition is placed on the base member 85 and is secured to the base member by means of the nuts 93. The remainder of the housing 83 is finally secured to the base member 85 to complete the assembly of the instrument and its housing. By following a reverse procedure, the instrument may be disassembled for inspection and servicing.

In order to adjust the instrument for operation, the button 81 and the attraction iron 99 are actuated without disturbing the housing 83. With the winding 11 deenergized, the button 81 is rotated to bring the pointer 47 to its correct position for indicating the deenergized condition of the winding 11 on an associated scale. Next a current having a known value equal approximately to the current required to rotate the pointer 47 to its extreme up-scale position is passed through the winding 11. The attraction iron 99 then is rotated by means of a screwdriver positioned in the slot 109 until the pointer 47 is at its correct position for the value of current passing through the winding 11.

When current is passed through the winding 11, magnetic flux is produced which flows through the space within the tubular portion 5, the rings 17 and 19 and the band 27. This magnetic flux also flows through the fixed iron 35 and the moving iron 43 in an axial direction to develop a repulsion force therebetween. Since the fixed iron 35 is tapered in an up-scale direction, the repulsion force has a torque component which urges the moving iron 43 in the up-scale direction. In addition, the magnetic flux flowing through the flanges 39 and 97 produces an additional repulsion force or torque acting to urge the moving iron 43 in an up-scale direction.

If the current flowing through the winding 11 is sufficient to bring the moving iron 43 within the zone of influence of the attraction iron 99, an attraction force is developed between the moving iron and the attraction iron. This is for the reason that, as viewed in Fig. 1, the upper end of the attraction iron 99 is adjacent to the path of travel of the lower end of the moving iron 43. Consequently, the magnetic polarities of these ends are opposite and the force therebetween is one of attraction.

The flanges 39 and 97, together with the attraction iron 99, cooperate with the tapered portion of the fixed iron 35 to provide a reasonably linear scale distribution for the instrument. The scale distribution is further modified by the noncircular opening 33 which is substantially in alignment with the tubular portion 5. By suitably shaping the opening 33, the magnetic flux distribution in the tubular portion 5 may be adjusted to provide a reasonably linear scale distribution for the instrument.

The flange 39 not only assists in developing a repulsion force acting on the moving iron 43, but it also serves as a magnetic screen or shield positioned between the ends of the fixed iron 35. The flange 39 is positioned substantially between the moving iron 43 and the attraction iron 99 (and 111 if employed), and substantially prevents the application of an attraction force to the moving iron 43 when the moving iron is in the down-scale position illustrated in Fig. 1.

Although the invention has been discussed with reference to certain specific embodiments thereof, numerous modifications are possible. Therefore, the invention is to be restricted only by the appended claims as interpreted in view of the prior art.

I claim as my invention:

1. In an electrical instrument, a stator assembly including a winding, a rotor assembly including a moving magnetic element, means mounting said rotor assembly for rotation relative to said stator assembly, and magnetic means cooperating with said magnetic element for applying a force thereto, said magnetic means comprising a substantially cylindrical magnetic element associated with said stator assembly, said magnetic elements being positioned in the magnetic field produced by current flowing in said winding to develop a torque between said magnetic elements which is responsive to said current, said cylindrical magnetic element having secured thereto a male screw-threaded part, the axis of said part being substantially parallel to the axis of rotation of said moving magnetic element, said stator assembly having a female screw-threaded opening positioned to receive in threaded relationship said part, whereby rotation of said part in said opening moves said cylindrical magnetic element to vary the torque between said magnetic elements.

2. In an electrical instrument assembly, a housing, a moving iron instrument positioned substantially in said housing, said instrument comprising a stator assembly including a winding, a rotor assembly including a moving magnetic element, means mounting said rotor assembly for rotation relative to said stator assembly, and magnetic means cooperating with said magnetic element for applying a force thereto, said magnetic means comprising a substantially cylindrical magnetic element associated with said stator assembly, said magnetic elements being positioned in the magnetic field produced by current flowing in said winding to develop a torque only in a predetermined direction between said magnetic elements which is responsive to said current, said cylindrical magnetic element having secured thereto a male screw-threaded part, the axis of said part being substantially parallel to the axis of rotation of said moving magnetic element, said stator assembly having a female screw-threaded opening positioned to receive in threaded relationship said part, whereby rotation of said part in said opening moves said cylindrical magnetic element to vary the torque between said magnetic elements, said housing having an opening aligned with said part to permit operation thereof externally of said housing.

3. In an electrical instrument, a winding unit effective when energized by electrical current for producing a magnetic field, a moving magnetic element, first means mounting said moving magnetic element on said winding unit for rotation through said magnetic field, a unit comprising a second magnetic element disposed in said magnetic field for producing a torque acting on said moving magnetic element, second mounting means, and means adjustably securing said second magnetic element only to said second mounting means for permitting adjustment of said torque, and means spaced from the second magnetic element for detachably securing the second mounting means to the winding unit, whereby said second mounting means and said second magnetic element may be removed as a unit from the remainder of said instrument without disturbing the adjustment of said second magnetic element relative to said second mounting means.

4. In an electrical instrument, means effective when energized for producing a magnetic field which varies in accordance with a quantity to be measured, a fixed magnetic element disposed in said magnetic field, a moving magnetic element disposed in said magnetic field, said magnetic elements being positioned to develop a force therebetween responsive to said magnetic field, means mounting said moving magnetic element for rotation relative to said fixed magnetic element, said fixed magnetic element comprising an arcuate portion extending adjacent the path of rotation of said moving magnetic element and configured to produce a torque acting on said moving magnetic element, said fixed magnetic element having a radial portion extending substantially radially relative to the axis of rotation of said moving magnetic element, said radial portion being positioned to produce a torque acting on said moving magnetic element, to urge said moving magnetic element from the first position adjacent said radial portion towards a second position distant from said radial portion, and a second fixed magnetic element for producing an additional torque acting on said moving element when said moving element is adjacent said second position, said radial portion being substantially between said moving magnetic element and said second fixed magnetic element when said moving magnetic element is adjacent said first position.

5. In a moving-iron instrument, means effective when energized for producing a magnetic field which varies in accordance with a quantity to be measured, a substantially cylindrical fixed magnetic element positioned to be in said magnetic field, said magnetic element having an axial length tapering from a predetermined value at a first point to a smaller value at a second point angularly displaced about the axis of said magnetic element from said first point, said magnetic element having a first flange projecting interiorly therefrom adjacent said first point in a plane substantially containing said axis, a moving magnetic element positioned adjacent the interior cylindrical surface of said fixed magnetic element, said moving magnetic element having a second flange which, when said moving magnetic element is adjacent said first point, is adjacent said first-mentioned flange, means mounting said moving magnetic element for rotation substantially about said axis, whereby in response to said magnetic field the cylindrical surface of said fixed magnetic element cooperates with said moving magnetic element to produce a first repulsion torque acting on said moving magnetic element and said flanges coact to produce a second repulsion torque acting on said moving magnetic element to move said moving magnetic element from a position adjacent said first point towards said second point, and an attraction magnetic element for developing an attraction force acting on said moving magnetic element when said moving magnetic element is adjacent said second point, said first flange being substantially between said moving magnetic element and said attraction magnetic element when said moving moving magnetic element is adjacent said first point.

6. In a moving-iron instrument, means effective when energized for producing a magnetic field which varies in accordance with a quantity to be measured, a repulsion fixed magnetic element positioned to be in said magnetic field, a moving magnetic element positioned adjacent said fixed magnetic element, means mounting said moving magnetic element for rotation relative to said fixed magnetic element in response to the repulsion force therebetween, magnetic shielding means positioned adjacent a first end of the path of travel of said moving magnetic element, and an attraction fixed magnetic element disposed adjacent a second end of said path for developing an attraction force acting on said moving magnetic element, said shielding means operating to shield said moving magnetic element from said attraction fixed magnetic element when said moving magnetic element is adjacent said first end.

7. In an electrical measuring instrument, a winding having a centrally disposed opening, said winding being effective, when energized, for producing a magnetic field in said opening, means for controlling the distribution of magnetic flux in said magnetic field, said means comprising a magnetic member having a second opening defining an inner surface through which magnetic flux in said magnetic field passes, said openings being substantially in alignment but not concentric with each other, whereby the configuration of said second opening controls the magnetic flux distribution in said magnetic field, and magnetic means responsive to the distribution of magnetic flux in said air gap.

HERBERT T. RIGHTS.

REFERENCES CITED

The following references are of record in the file of this patent:

UNITED STATES PATENTS

| Number | Name | Date |
|---|---|---|
| 1,501,189 | Record | July 15, 1924 |
| 1,835,658 | Mabie | Dec. 8, 1931 |
| 2,119,015 | Kurz | May 31, 1938 |
| 2,157,947 | Young et al. | May 9, 1939 |
| 2,183,566 | Hoare | Dec. 19, 1939 |
| 2,183,685 | Lingg | Dec. 19, 1939 |
| 2,237,142 | Holtz | Apr. 1, 1941 |
| 2,260,026 | Hoare | Oct. 21, 1941 |

FOREIGN PATENTS

| Number | Country | Date |
|---|---|---|
| 290,738 | Great Britain | May 21, 1928 |
| 296,749 | Great Britain | Mar. 7, 1928 |